(No Model.) 6 Sheets—Sheet 1.
O. PARPART.
MACHINE FOR CUTTING GROOVES IN TWIST DRILLS.
No. 558,205. Patented Apr. 14, 1896.
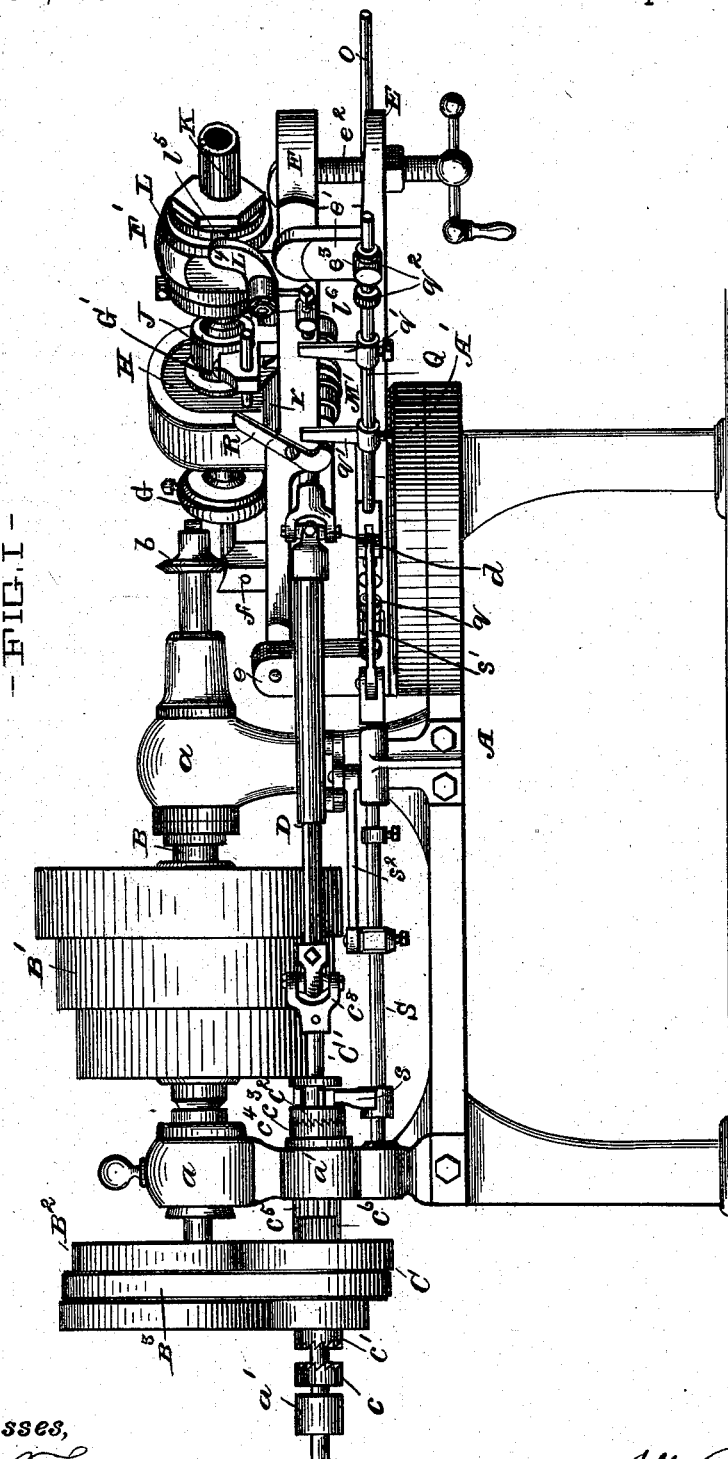

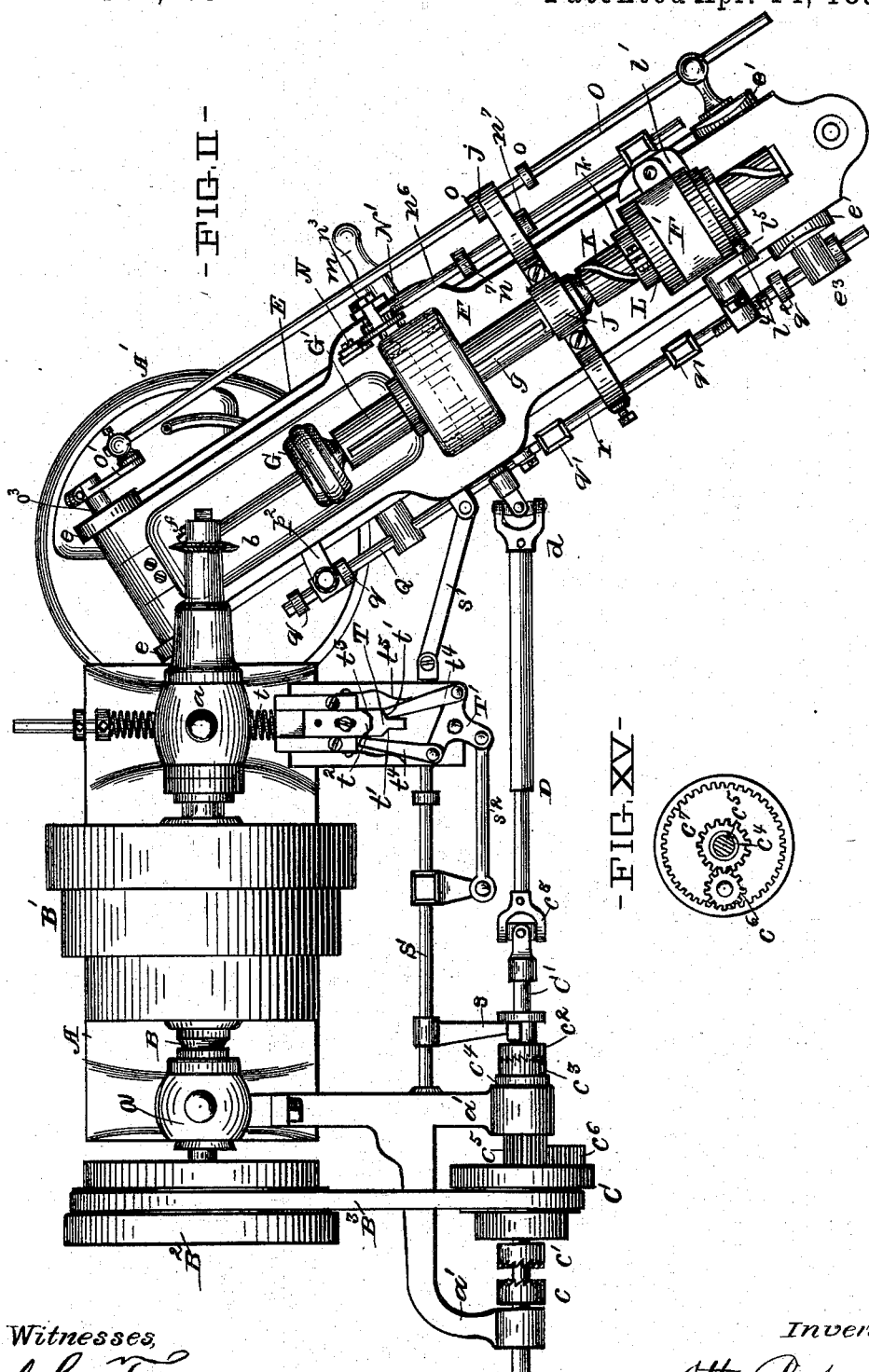

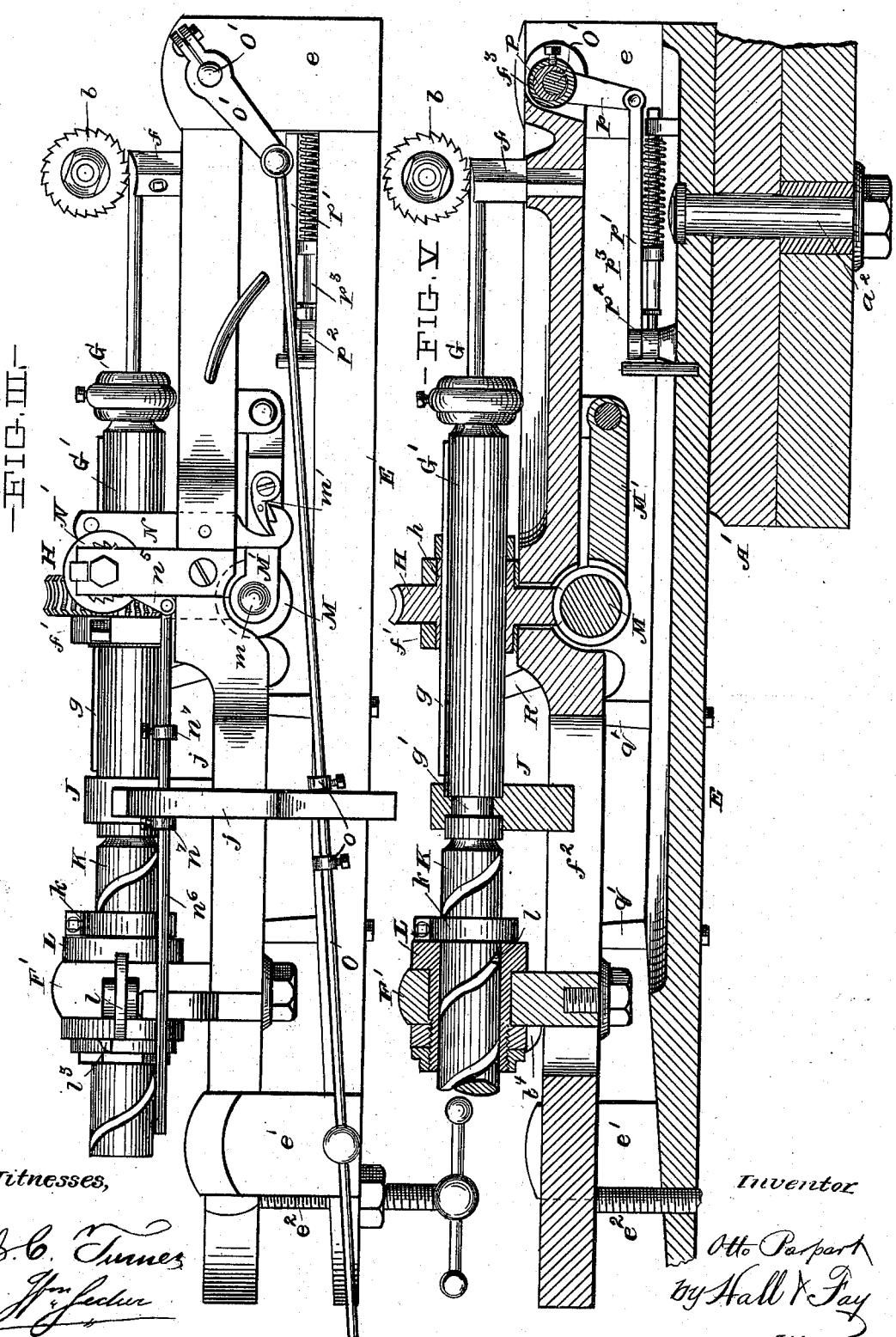

(No Model.)
6 Sheets—Sheet 4.
O. PARPART.
MACHINE FOR CUTTING GROOVES IN TWIST DRILLS.
No. 558,205.
Patented Apr. 14, 1896.
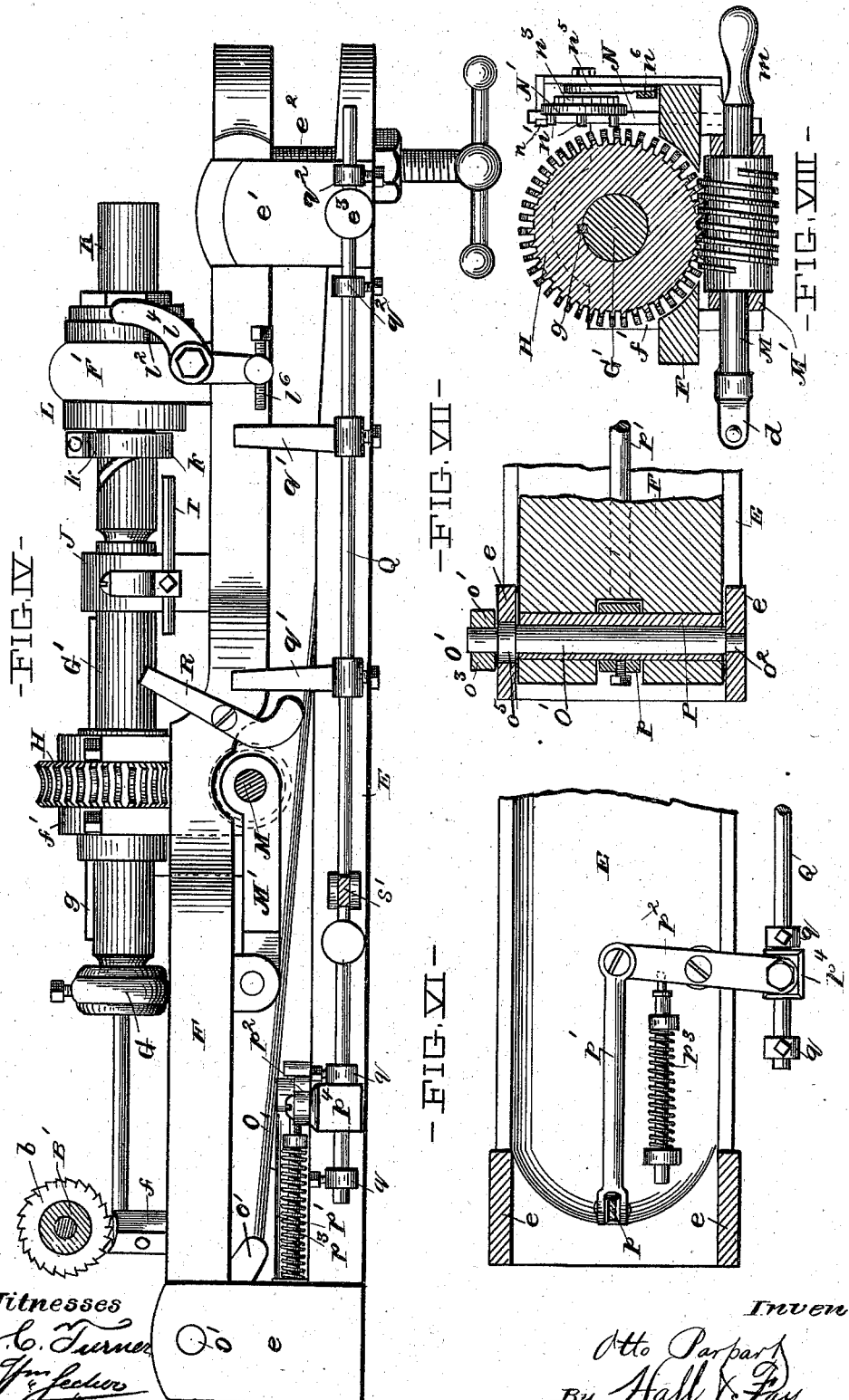
Witnesses
J. C. Turner
Wm Fecker
Inventor,
Otto Parpart
By Hall & Fay
Attys.

(No Model.) 6 Sheets—Sheet 5.
O. PARPART.
MACHINE FOR CUTTING GROOVES IN TWIST DRILLS.
No. 558,205. Patented Apr. 14, 1896.
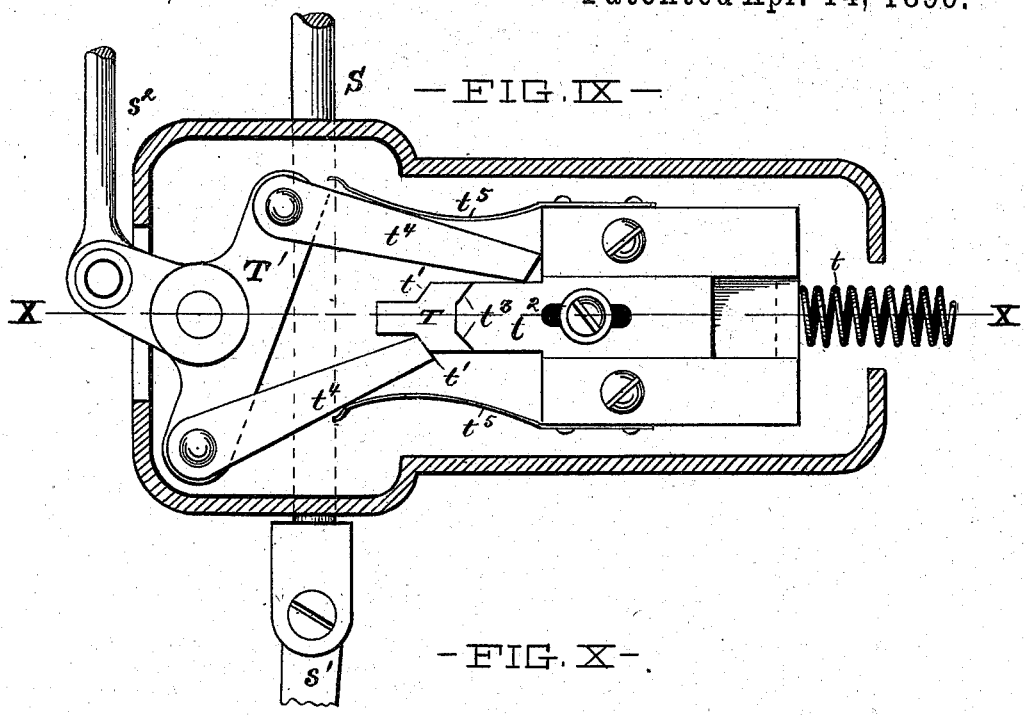
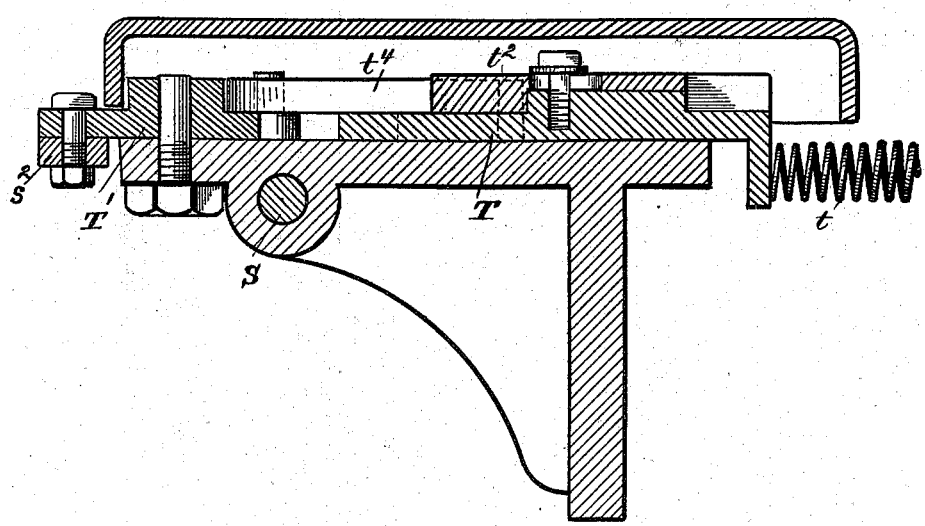
Witnesses
Inventor
Otto Parpart
By Hall & Fay
Attys.

(No Model.) 6 Sheets—Sheet 6.
O. PARPART.
MACHINE FOR CUTTING GROOVES IN TWIST DRILLS.
No. 558,205. Patented Apr. 14, 1896.
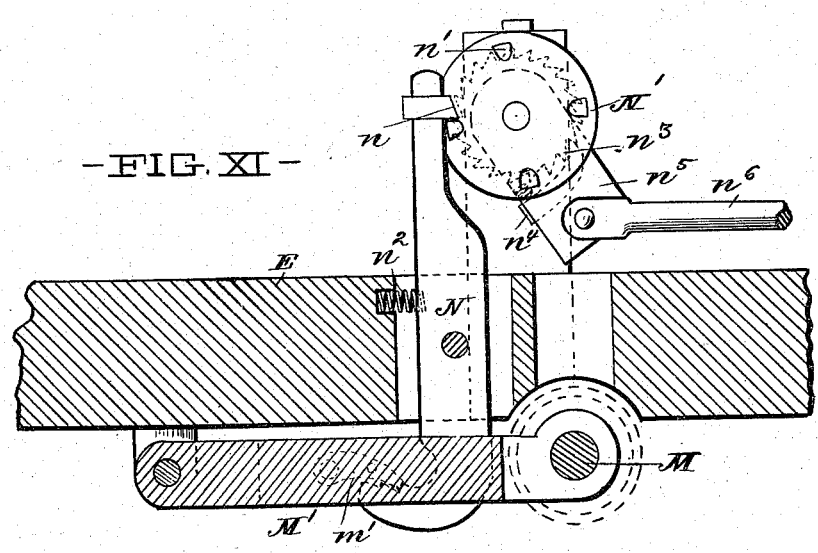
- FIG. XI -
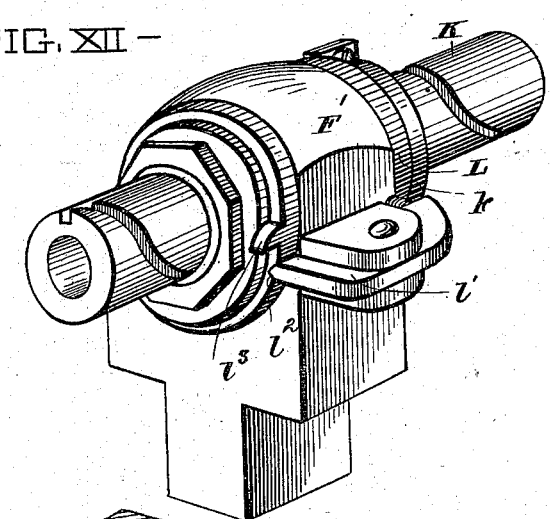
- FIG. XII -
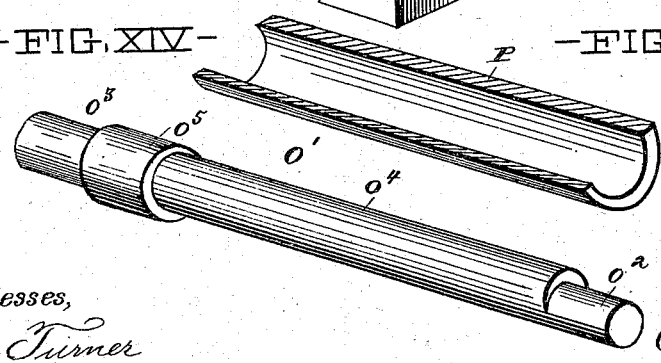
- FIG. XIV -   - FIG. XIII -
Witnesses,
J. C. Turner
Wm. Lecher
Inventor,
Otto Parpart
By Hall & Fay
Atty's.

UNITED STATES PATENT OFFICE.

OTTO PARPART, OF CLEVELAND, OHIO, ASSIGNOR TO THE STANDARD TOOL COMPANY, OF SAME PLACE.

MACHINE FOR CUTTING GROOVES IN TWIST-DRILLS.

SPECIFICATION forming part of Letters Patent No. 558,205, dated April 14, 1896.

Application filed August 18, 1894. Serial No. 520,666. (No model.)

*To all whom it may concern:*

Be it known that I, OTTO PARPART, a citizen of the United States, and a resident of Cleveland, county of Cuyahoga, and State of Ohio, have invented certain new and useful Improvements in Machines for Cutting Grooves in Twist-Drills, of which the following is a specification, the principle of the invention being herein explained and the best mode in which I have contemplated applying that principle so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents an elevation of my improved machine for cutting the grooves in twist-drills; Fig. II, a top plan view of the machine; Fig. III, a side view of the mechanism which carries and feeds the drill-blank; Fig. IV, a view from the opposite side of such mechanism; Fig. V, an axial section of said mechanism; Fig. VI, a detail plan view of a portion of the mechanism which raises and lowers one end of the plate supporting the drill-blank-feeding mechanism; Fig. VII, a horizontal section of the said end of the plate and of the cam mechanism for the same; Fig. VIII, a transverse section of the worm-gear which revolves the chuck-spindle; Fig. IX, a top plan view of the latch for the clutch-shifting mechanism; Fig. X, a vertical section on the line X X in Fig. IX of the same; Fig. XI, a detail view of the mechanism which releases the worm-shaft; Fig. XII, a perspective view of the end of the chuck-spindle; Figs. XIII and XIV, a sectional perspective view and a perspective view, respectively, of the cam-sleeve and cam-shaft which serve to raise and lower the end of the chuck-spindle; and Fig. XV, a detail view of the planet-gear for the clutch-shaft.

The machine is supported upon a table A, which is formed with bearings $a$, in which the shaft B for the milling-tool $b$ is journaled. The shaft receives rotary motion from a suitable source, having preferably a cone-pulley B', to which motion is communicated by a belt. At the end of the milling-tool shaft is a cone-pulley $B^2$, around which passes a belt $B^3$, which also passes around a cone-pulley C, which revolves upon a clutch-shaft C', journaled in bearing-brackets $a'$, projecting from the table. Near one end the shaft has a half-clutch $c$ secured upon it, which half-clutch may engage a half-clutch $c'$ upon the end of the cone-pulley when the shaft is longitudinally shifted. Near the other end of the shaft a half-clutch $c^2$ is secured, which half-clutch may engage another half-clutch $c^3$ when the shaft is longitudinally shifted in the opposite direction. Said half-clutch $c^3$ is formed upon a sleeve $c^4$, which is journaled in one of the bearing-brackets and within which the shaft revolves. At the other end the sleeve has a pinion $c^5$, which meshes with a pinion $c^6$, journaled upon a stud projecting from the face of the cone-pulley. Said last-mentioned pinion meshes with an internal cog-rim $c^7$ upon the cone-pulley. By this arrangement the shaft may be revolved in opposite directions from the cone-pulley, which is revolved in one direction by longitudinally shifting the shaft in one or the other direction.

The shaft C' has a gimbal-joint $c^8$ at one end, by means of which it is connected to a telescoping shaft D, the other end of which is connected by a gimbal-joint $d$ to the worm-shaft of the drill-blank-feeding mechanism.

One end of the machine-table is formed with a turn-table A', through the center of which passes a nutted bolt $a^2$, which also passes through the bed-plate E of the drill-blank-feeding mechanism, so that the angle of said plate to the milling-tool shaft, and consequently the pitch of the twist in the drill, may be adjusted by means of said bolt. The bed-plate has two ears $e$ at its forward end and two ears $e'$ at its rear end, and a supporting-plate F is secured at its ends between said ears, the forward end of the plate being supported to be raised and lowered by a cam mechanism supported in the forward ears and the rear end of the plate being supported upon the end of a screw $e^2$, projecting up through the rear end of the bed-plate. A support $f$ projects upward from the supporting-plate near the forward end of the same and serves to support the end of the drill-blank, being immediately beneath the milling-tool. The drill-blank is supported in a chuck G in the end of a spindle G', which slides in and revolves with a worm-wheel H and its hub $h$, which is journaled in a bearing $f'$ upon the supporting-plate. The spindle has preferably a feather $g$, and the bore of the worm-wheel and hub has a groove into which said feather fits. The rear end of the spindle has a circumferential groove $g'$, and said circumferentially-grooved portion is journaled in a correspondingly-shaped bearing-block J, which slides in a longitudinal slot $f^2$ in the supporting-plate. A feed-screw K, technically known as the "form," is secured to the rear end of the spindle and has a spiral groove which controls the pitch of the groove cut into the drill-blank, and the length of such groove is controlled by a collar $k$, adjustably secured upon the form.

The form may revolve within a bushing L, having a lug $l$ in its bore, which enters the groove, and thus causes the form to move forward or back as it is revolved, when the bushing is prevented from revolving in its bearing F' upon the supporting-plate by a spring-pawl $l'$ upon said bearing and engaging one of two notches $l^2$ in the bushing. The rear end of the bushing has two cam projections $l^3$ at diametrically-opposite points, which cam projections are beveled at one side and may engage and rock a stop-dog $l^4$, fulcrumed upon the bearing F' and provided with a roller $l^5$ upon its upper end and with a stop-screw $l^6$ in its lower end. The bushing may be revolved in its bearing by the form when the collar upon the latter bears against the forward end of the bushing at the end of its rearward movement, when the force upon the bushing will cause the spring-pawl to be disengaged from its notch, so that the bushing may make a one-half revolution, and thereby cause a cam projection to rock the stop-dog.

A worm-shaft M, which is coupled to the telescoping shaft D by the gimbal-joint $d$, engages the worm-wheel from below and is transversely journaled beneath the supporting-plate in a hinged bearing-frame M'. The end of the worm-shaft opposite the end having the gimbal-joint has a handle $m$, by means of which the shaft may be raised or lowered, and a pawl $m'$ is pivoted upon the side of the bearing-frame and engages the lower hooked end of a trip-lever N, which is fulcrumed upon the side of the supporting-frame, so that the bearing-frame may be held in its raised position with the worm engaging the wheel. The upper end of the trip-lever has a projecting and beveled nose-piece $n$, which is normally held to engage one of a number of pins $n'$ upon the face of a disk N' by means of a spring $n^2$, which bears against the upper end of the trip-lever. A ratchet-wheel $n^3$ is secured to the outer edge of the disk and is engaged by a spring-pawl $n^4$ upon a lever $n^5$, fulcrumed at the center of the ratchet-wheel. A rod $n^6$ is pivoted to the outer end of the lever and slides parallel to the spindle and form and is provided with two adjustable stops $n^7$, which may be engaged at the ends of the forward and rearward movement of the spindle and form by an arm $j$, projecting from the sliding bearing-block J upon the spindle. The stops and the pawl-and-ratchet device are so arranged that the trip-lever will be rocked by a pin upon the disk striking the beveled nose upon the lever at the end of every second rearward movement of the spindle and form.

A rod O has two stops $o$ secured upon it to also be engaged by the arm which projects from the sliding bearing-block J, and the forward end of said rod is pivoted to the lower end of an arm $o'$, which is secured to a cam-shaft O', passing through the ends of the forward ears $e$ of the bed-plate and through the forward end of the supporting-plate. The end $o^2$ of the cam-shaft opposite the arm is concentric with the end $o^3$, to which the arm is secured; but the body $o^4$ of the shaft is eccentric to said end and bulges in a direction opposite to the bulge of a cam $o^5$ immediately inside of the arm upon the cam-shaft. The concentric end $o^2$ and the cam $o^5$ are journaled, respectively, in the ears of the bed-frame.

A cam-sleeve or eccentric sleeve P fits upon the eccentric body of the cam-shaft and fits in a cylindrical bore $f^3$, which traverses the forward end of the supporting-frame. An arm $p$ is secured to the middle of the eccentric sleeve and has a connecting-rod $p'$ pivoted to its lower end. The other end of said connecting-rod is pivoted to a lever $p^2$, pivoted upon the under side of the supporting-frame and having a spring-bolt $p^3$ bearing against its inner arm to push the latter rearward. The outer arm has a box $p^4$, which slides upon a rod Q between two adjustable stops $q$.

The rod Q has two adjustable stops $q'$ secured upon it to project upward, and two stop-collars $q^2$ are adjustably secured near the rear end of the rod, one at each side of a perforated lug $e^3$, projecting from the side of the bed-plate and in which the rod slides, said stop-collars controlling the extent of sliding movement of the rod. The forward upwardly-projecting stop $q'$ may be engaged by the lower end of a stop-lever R, fulcrumed upon the supporting-plate, and the upper arm of said stop-lever may be engaged by the forward end of a stop-rod $r$, adjustably secured in a lateral projection of the sliding bearing-block J for the rear end of the spindle. The rear upwardly-projecting stop $q'$ may be engaged by the stop-screw $l^6$ upon the stop-dog $l^4$. The half-clutch $c^2$ upon the longitudinally-sliding shaft which drives the worm has a circumferential groove which is engaged by an arm $s$, projecting from a longitudinally-movable rod S, which is connected to be longitudinally shifted by means of a connecting-rod $s'$, pivotally connected to the clutch-shifting rod S and to the clutch-operating rod Q.

For the purpose of quickly throwing the clutch-shifting rod by the longitudinal movement in either direction of the clutch-operating rod a latch mechanism (illustrated in Figs. IX and X) is provided. Said latch mechanism has a bolt T, which slides in suitable bearings and is forced outward by a spring $t$. The outer end of said bolt has two slightly oblique shoulders $t'$, and a bar $t^2$, having correspondingly oblique corners $t^3$, is secured, longitudinally adjustable, upon the upper side of the bolt, slightly to the rear of the shoulders. A T-shaped lever T' is pivoted at its middle in front of the end of the bolt and has two dogs $t^4$ pivoted upon the ends of its head, said dogs having springs $t^5$ bearing against them and forcing them against the sides of the bolt. A rod $s^2$ is pivoted to the end of the shank of the T-lever and to the clutch-shifting rod, so that said lever may be rocked as the rod is shifted.

In describing the operation of the machine the drive-shaft will be assumed as connected to be continuously revolved by a suitable power source and all of the parts to be in the positions illustrated in the drawings, excepting the worm and its trip mechanism, which must be in a position with the worm disengaged from the wheel, so that the drill-blank may be inserted in the chuck. When the drill-blank is secured in the chuck, the worm-shaft is raised by its handle, when it will be retained in such position by means of the trip mechanism. As the spindle and form are rotated by the worm-gear the drill-blank will be moved forward while it is slowly rotated, and the milling-tool will cut a spiral groove in the blank. The advance of the spindle and form will cause the arm of the sliding bearing J to engage the forward stop $o$ upon the rod O, causing the rod to rotate the cam-shaft in the forward end of the supporting-plate, and thereby gradually lower said end, so that the milling-tool will cut a groove which gradually decreases in depth toward the shank of the drill. At the end of the forward movement of the spindle and form the stop-rod $r$ upon the movable bearing will rock the stop-lever R, causing the latter to bear backward against the forward upwardly-projecting stop $q'$ upon the clutch-operating rod Q, thereby moving said rod back. This movement will cause the forward stop $q$ upon the rod to rock the lever which actuates the eccentric sleeve in the forward end of the supporting-plate, which sleeve will turn, so as to lower said end and bring the drill-blank out of contact with the milling-tool. At the same time the back movement of the clutch-operating rod will draw upon the connecting-rod $s'$ and the clutch-shifting rod S, causing the latch mechanism to snap into a reversed position and the clutch-shaft to be shifted, so as to be revolved in the opposite direction. This will reverse the movement of the worm, worm-wheel, spindle, and form, causing the two last-mentioned elements to be drawn back. When the collar upon the form reaches the point where it bears against the bushing L, it will revolve said bushing a one-half revolution and will cause one of the cam projections upon the bushing to rock the stop-dog in such manner that its stop-screw will engage the rear upwardly-projecting stop upon the clutch-operating rod, throwing said rod forward, and thereby shifting the clutch-shifting rod and rocking the eccentric sleeve to again raise the forward end of the supporting-plate. The spindle and form will again start upon their forward movement with the drill-blank revolved, so as to have the second groove cut into it. While the spindle and form are at the rear end of their rearward movement, the arm upon the sliding bearing J moves the rod O, so as to again raise the forward end of the supporting-plate, and moves the rod $n^6$, so as to partly rotate the ratchet-wheel $m^3$ and the pin-disk N. When the second groove has been cut in the drill and the spindle and form have finished their backward movement, all of the parts performing the same functions as while the first groove was cut, the rod $n^6$ and its pawl will have rotated the ratchet-wheel $n^3$ and the pin-disk in such a manner that the trip-lever will be tilted by a pin and the hinged bearing-frame for the worm-shaft will be released to disengage the worm from its wheel. This will allow the drive-shaft to revolve continuously without any action of the milling-tool upon the drill, so that if the attendant is occupied with another machine the machine may continue to run without any effect.

As this machine automatically rotates the bushing upon the form and the form and spindle with it after the first groove has been cut in the blank and automatically starts the cutting of the second groove, it will require less attention than the machines now in general use, in which the bushing, form, and spindle are positively rotated to cut the second groove, and the machine requires to have the spindle and form positively drawn back and positively started to cut each groove. Consequently one attendant can care for a greater number of machines provided with my improvement than the old form of machines, the only attention necessary being the removal of the grooved drill, the insertion of a new blank, and the starting of the cutting of the first groove in the new blank by raising the handle upon the worm-shaft to again bring the worm into engagement with the worm-wheel. The clutch-shifting rod will be quickly and completely thrown by the latch mechanism and will be held in its thrown position by the same. As a pull or a push is exerted upon the shifting-rod the connecting-rod $s^2$ will rock the T-lever, so as to cause one dog to push inward upon the shoulder of the spring-bolt. The end of the other dog will be drawn toward the other shoulder of the bolt and will at last slip over said shoulder at the same time the first dog slips off from its shoulder, when the spring of the bolt will force the bolt and the second dog outward, completing the throw of the T-lever, connecting-rod, clutch-shifting rod, and clutch-shaft.

While the form of latch mechanism illustrated and described is the form which I prefer to employ in the present machine, yet other devices embodying the principle of an unstable push-and-pull mechanism whereby the shifting-rod may be quickly moved after it has been moved a distance of its throw may be employed, such mechanism being commonly used in electric switches and other devices where a quick motion from a slow initial movement is required.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. In a machine for cutting the grooves in twist-drills, the combination with a cutting-tool and a spindle and form for rotating the drill-blank and feeding it forward and back, of a shaft provided with means for alternately revolving it in opposite directions and connected to rotate the spindle and form, and a shifting mechanism for reversing the rotation of the shaft constructed to be actuated by the spindle and form at the extremes of the forward and back movements of the same, substantially as set forth.

2. In a machine for cutting the grooves in twist-drills, the combination with a cutting-tool and a spindle and form for rotating the drill-blank and feeding it forward and back, of a shaft provided with means for alternately revolving it in opposite directions and connected to rotate the spindle and form, means for disengaging and engaging such connection between the shaft and the spindle and form, and a shifting mechanism for reversing the rotation of the shaft constructed to be actuated by the spindle and form at the extremes of the forward and back movements of the same, substantially as set forth.

3. In a machine for cutting the grooves in twist-drills, the combination with a cutting-tool and a spindle and form for rotating the drill-blank and feeding it forward and back, of a shaft provided with means for alternately revolving it in opposite directions and connected to rotate the spindle and form, a trip device for disengaging such connection between the shaft and the spindle and form and connected to be actuated from said spindle and form at the end of every second backward movement of the same, and a shifting mechanism for reversing the rotation of the shaft constructed to be actuated by the spindle and form at the extremes of the forward and back movements of the same, substantially as set forth.

4. In a machine for cutting the grooves in twist-drills, the combination with a cutting-tool and a spindle and form for rotating the drill-blank and feeding it forward and back, of gearing for rotating said spindle and form, and a trip device for disengaging such gearing and constructed to be actuated from the spindle and form at the end of a back movement of the same, substantially as set forth.

5. In a machine for cutting the grooves in twist-drills, the combination with a cutting-tool and a spindle and form for rotating the drill-blank and feeding it forward and back, of a gear having means for rotating it and supported in a swinging bearing and connected to impart rotary motion to the spindle and form, a trip-lever supporting the swinging bearing, a disk having pins upon its face which engage and trip said lever and having a ratchet-wheel, and a pawl-lever engaging said ratchet-wheel and connected to be rocked by the movement of the spindle and form, substantially as set forth.

6. In a machine for cutting the grooves in twist-drills, the combination with a cutting-tool and a spindle and form for rotating the drill-blank and feeding it forward and back, of a bushing through which the form passes and provided with a lug which engages the spiral of the form, a bearing in which the bushing may turn, and a stop upon the form adapted to bear against one end of the bushing so as to revolve the latter with the form at the end of its longitudinal movement, substantially as set forth.

7. In a machine for cutting the grooves in twist-drills, the combination of a cutting-tool, a supporting-plate, a spindle and form having means for rotating them and longitudinally moving them upon the supporting-plate, means for gradually lowering the end of the supporting-plate beneath the cutting-tool as the spindle and form move forward, and a cam mechanism at the end of the supporting-plate beneath the cutting-tool and connected to be actuated by the spindle and form to lower said end of the supporting-plate at the end of the forward movement of the spindle and form, substantially as set forth.

8. In a machine for cutting the grooves in twist-drills, the combination of a cutting-tool, a supporting-plate pivotally supported at one end, a pair of bearings at the sides of the end of said plate beneath the cutting-tool, a shaft having a concentric portion journaled in one bearing and an eccentric portion journaled in the other bearing and having an eccentric body and an arm upon one end, an eccentric sleeve upon the body portion of the shaft and turning in a transverse bore in the end of the supporting-plate and provided with an arm at its middle, a spindle and form having means for rotating them and for longitudinally moving them upon the supporting-plate, a sliding rod pivoted to the arm of the eccentric shaft and provided with stops engaged by a projection from the spindle, a sliding rod connected to rock the arm upon the eccentric sleeve and provided with stops, and means for longitudinally moving said rod from the longitudinal movements of the spindle and form, substantially as set forth.

9. In a machine for cutting grooves in twist-drills, the combination with a cutting-tool and a spindle and form for rotating the drill-blank and longitudinally moving it, of a pulley having means for rotating it in one direction, a shaft connected to rotate the spindle and form, clutch mechanism upon said shaft and pulley for reversing the movement of the shaft as the clutch mechanism is shifted, a clutch-shifting rod connected to shift the clutch mechanism and connected to be longitudinally moved at the extremes of the forward and back movements of the spindle and form, and a latch mechanism connected to exert an unstable tension in either direction upon the clutch-shifting rod so as to quickly shift said rod when the latter receives a slow initial movement in either direction, substantially as set forth.

10. In a machine for cutting grooves in twist-drills, the combination with a cutting-tool and a spindle and form for rotating the drill-blank and longitudinally moving it, of a pulley having means for rotating it in one direction and formed with a half-clutch at one face and with an internal cog-rim, a shaft journaled to revolve and longitudinally move within said pulley and provided with a half-clutch engaging the half-clutch of the pulley and with another half-clutch, and connected to rotate the spindle, a sleeve provided with a half-clutch adapted to be engaged by said last-mentioned half-clutch and with a pinion, a pinion journaled upon the pulley and engaging said last-mentioned pinion and the cog-rim of the pulley, a longitudinally-movable, clutch-shifting rod connected to longitudinally shift the shaft and its clutches and connected to be longitudinally shifted at the extremes of the forward and back movements of the spindle and form, and a latch mechanism connected to exert an unstable tension in either direction upon the clutch-shifting rod so as to quickly shift said rod when the latter receives a slow initial movement in either direction, substantially as set forth.

11. In a machine for cutting grooves in twist-drills, the combination with a cutting-tool and a spindle and form for rotating the drill-blank and longitudinally moving the same, of a shaft connected to impart rotary movement to said spindle and form, a clutch mechanism for reversing the motion of said shaft, a rod connected to shift said clutch mechanism and connected to be longitudinally shifted at the extremes of the forward and back movements of the spindle and form, a spring-actuated bolt having a projecting nose and oblique shoulders at the sides of said nose, a bar secured upon the upper side of the bolt and formed with oblique corners corresponding to the oblique shoulders and slightly to the rear of the same, a T-shaped lever fulcrumed at the middle of its head, dogs pivoted to the ends of the T-head to have their ends engage the oblique shoulders of the bolt and having springs forcing them against said bolt, and a rod pivoted to the shank of the T-lever and to the shifting-rod, substantially as set forth.

In testimony that I claim the foregoing to be my invention I have hereunto set my hand this 7th day of August, A. D. 1894.

OTTO PARPART.

Witnesses:
WM. SECHER,
DAVID T. DAVIES.